(12) United States Patent
Katz

(10) Patent No.: US 8,444,169 B1
(45) Date of Patent: May 21, 2013

(54) TRAILER HITCH COUPLER

(76) Inventor: Steven A. Katz, Charlevoix, MI (US)

( * ) Notice: Subject to any disclaimer, the term of this patent is extended or adjusted under 35 U.S.C. 154(b) by 0 days.

(21) Appl. No.: 13/348,288

(22) Filed: Jan. 11, 2012

Related U.S. Application Data

(60) Provisional application No. 61/431,691, filed on Jan. 11, 2011.

(51) Int. Cl.
*B60D 1/06* (2006.01)

(52) U.S. Cl.
USPC ........... 280/511; 280/477; 280/504; 280/508; 280/510

(58) Field of Classification Search
USPC ..................... 280/511, 477, 504, 508, 510
See application file for complete search history.

(56) References Cited

U.S. PATENT DOCUMENTS

| | | | |
|---|---|---|---|
| 2,355,695 A | 8/1944 | Atwood | |
| 2,872,213 A | 2/1959 | Hosford | |
| 2,911,233 A | 11/1959 | Riddle | |
| 2,940,775 A | 6/1960 | Farrow | |
| 3,630,546 A | 12/1971 | Church | |
| 3,837,674 A | 9/1974 | Rathsack | |
| 3,891,237 A | 6/1975 | Allen | |
| 3,922,006 A | 11/1975 | Borges | |
| 3,951,434 A | 4/1976 | Sause | |
| 4,072,320 A | 2/1978 | Powell | |
| 4,232,877 A | 11/1980 | Milton | |
| 4,248,450 A | 2/1981 | McWethy | |
| 4,271,401 A * | 6/1981 | Meo ............................... 340/431 |
| 4,319,766 A | 3/1982 | Corteg et al. | |
| 4,522,421 A | 6/1985 | Vance | |
| 4,568,098 A | 2/1986 | Landry, Jr. | |
| 4,596,406 A | 6/1986 | Van Vleet et al. | |
| 4,627,633 A | 12/1986 | Gehman et al. | |
| 4,629,207 A | 12/1986 | Shiflet | |
| 4,697,818 A | 10/1987 | Moore | |
| 4,772,039 A | 9/1988 | Cook | |
| 4,889,356 A | 12/1989 | Morris | |
| 5,044,652 A | 9/1991 | Brisson | |
| 5,085,452 A | 2/1992 | Janeiro | |
| 5,211,416 A | 5/1993 | Blacklaw | |
| 5,265,899 A | 11/1993 | Harrison | |
| 5,322,313 A | 6/1994 | Schroeder | |
| 5,351,982 A | 10/1994 | Walrath | |
| 5,421,600 A | 6/1995 | Jones et al. | |
| 5,558,350 A * | 9/1996 | Kimbrough et al. ........... 280/426 |
| 5,560,630 A | 10/1996 | Phares et al. | |
| 5,725,229 A | 3/1998 | McWethy | |
| 5,839,744 A | 11/1998 | Marks | |

(Continued)

*Primary Examiner* — Tashiana Adams
*Assistant Examiner* — Marlon Arce
(74) *Attorney, Agent, or Firm* — Husch Blackwell LLP; H. Frederick Rusche

(57) ABSTRACT

A trailer hitch coupler to couple a trailer to a trailer hitch includes a socket adapted for receiving a trailer hitch ball; a clamp associated with the socket and operable for engaging the trailer hitch ball; a sensor operatively connected with the socket and operable for determining a distance between an inner surface of the socket and an outer face of the trailer hitch ball when the trailer hitch ball is positioned within the socket; a clamp prevention device operatively connected with the socket and with the clamp and operable to prevent engagement of the clamp with the trailer hitch ball; and a release mechanism operatively connected with the sensor and the clamp prevention device and operable to release the clamp prevention device to allow the clamp to engage the trailer hitch ball when the sensor communicates a desired hitch condition.

12 Claims, 3 Drawing Sheets

U.S. PATENT DOCUMENTS

| | | | | |
|---|---|---|---|---|
| 5,860,669 | A | 1/1999 | Wass et al. | |
| 5,997,025 | A * | 12/1999 | Wisecarver | 280/508 |
| 6,199,891 | B1 | 3/2001 | Bell et al. | |
| 6,206,400 | B1 | 3/2001 | Stech | |
| 6,637,765 | B2 | 10/2003 | Barton | |
| 6,715,781 | B1 | 4/2004 | Smith | |
| 6,802,523 | B1 | 10/2004 | Profitt | |
| 6,932,376 | B1 | 8/2005 | Profitt | |
| 6,979,015 | B1 | 12/2005 | Eberle | |
| 7,264,261 | B2 | 9/2007 | Konsela | |
| 7,347,440 | B2 | 3/2008 | Shannon | |
| 7,431,320 | B2 | 10/2008 | Madden, III et al. | |
| 7,434,826 | B1 * | 10/2008 | Lambros | 280/508 |
| 7,478,821 | B2 | 1/2009 | Konsela | |
| 7,673,894 | B2 | 3/2010 | Bender | |
| 7,735,848 | B2 | 6/2010 | Konsela | |
| 7,926,832 | B1 * | 4/2011 | Hall | 280/441.2 |
| 2002/0024194 | A1 | 2/2002 | Ross | |
| 2004/0075240 | A1 | 4/2004 | Staggs | |
| 2005/0067812 | A1 | 3/2005 | Moss et al. | |
| 2005/0280245 | A1 | 12/2005 | Eberle | |
| 2006/0175800 | A1 * | 8/2006 | Scharmuller | 280/477 |
| 2010/0207357 | A1 | 8/2010 | Hathcock et al. | |

* cited by examiner

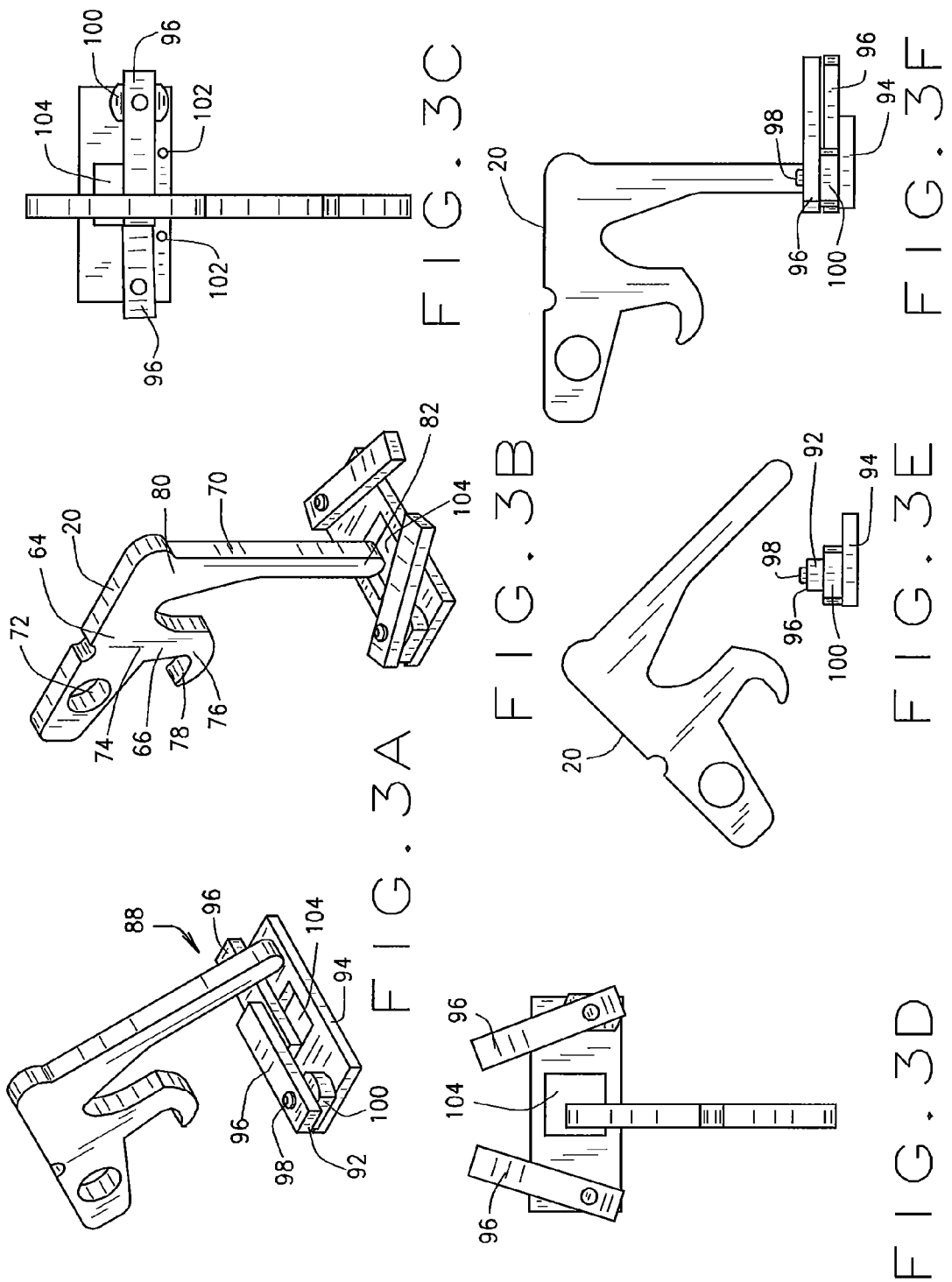

TRAILER HITCH COUPLER

CROSS REFERENCE

This application claims priority to U.S. Provisional Patent Application No. 61/431,691, filed Jan. 11, 2011.

BACKGROUND OF THE INVENTION

Many existing trailer hitches implement a hitch ball and socket connection to provide a connection of a trailer to a vehicle for towing. The trailer hitch connected to the vehicle is generally a hitch ball of a certain diameter and having a certain shank diameter to carry a desired load. Common hitch ball sizes include ball diameters of 1⅞", 2", and 2 5/16". Hitch balls usually include a shank that distances the hitch ball above the hitch and provides a threaded connection to the vehicle. Common shanks have a round cross-section and have 3/4", 1", or 1¼" diameters. A user will select a hitch ball of a certain diameter and a shank of a certain diameter to achieve a certain towing load capacity.

A trailer generally includes a trailer hitch coupler that includes a socket that receives the hitch ball. The coupler also includes a mechanical device to bring a clamping member into contact with the bottom of the hitch ball. Common mechanical devices include a hand crank and a lever. When the mechanical device is disengaged, the clamping member is loose and the coupler can be lifted over the hitch ball. When the mechanical device is engaged, a clamping member is raised into contact or near contact to the bottom of the hitch ball securing the trailer to the hitch ball. The clamping device and the socket generally form an opening that is smaller than the hitch ball diameter to prevent the hitch ball from being disengaged from the coupler while towing. In one commonly used coupler, a hand crank or lever includes a hook or latch that locks the hand crank or lever in an engaged position while towing to prevent the accidental loosening of the hand crank or lever resulting in an accidental release of the clamp. As an additional safety measure, it is also common to further secure a lever latch with a pin or a padlock. The hitch ball and coupler assembly provides force transfer in both lateral and vertical directions and provides a pivot point allowing the vehicle to turn, bank, and yaw while towing the trailer and maintaining a secure attachment to the towing vehicle.

SAE International has specified classes of hitch and coupler connections to be certified to pull a trailer having a trailer Gross Vehicle Weight ("GVW"). The GVW is the total weight of the load carried by the trailer including the trailer weight. For example, Class 1 assemblies include all trailers that carry a GVW of 2000 lbs., Class 2 includes all trailers that carry a GVW from 2000 lbs to 3500 lbs., Class 3 includes all trailers that carry a GVW from 3500 lbs. to 5000 lbs.; and Class 4 includes all types of trailers with a GVW between 5000 lbs. and 10,000 lbs. The trailer hitch assembly of the hitch ball, shank, and coupler are generally selected to be able to tow trailers of a certain weight class. Generally, the larger the hitch ball and shank diameter, the greater the load that may be transferred through the trailer hitch assembly. A coupler is selected having a material thickness sufficient to transfer the pull force to tow the desired GVW of the trailer. Thus, using the correct combination of hitch ball, shank diameter, and a coupler is fundamental to the safe and effective towing of trailers carrying various loads.

One shortcoming in the prior art is that it is possible for a coupler configured for a larger sized hitch ball may be placed over a smaller hitch ball. For example, a coupler configured to receive a 2 5/16" hitch ball to be placed over a 2" or 1⅞" diameter hitch ball. The coupler will also latch when a coupler configured for a larger hitch ball is placed over a hitch ball of a smaller size giving the operator the false impression that the trailer is securely coupled to the vehicle. This situation can be very dangerous. If the trailer hitch connection is subjected to a vertical force by hitting a bump, or even rapid deceleration, the trailer can become detached from the hitch ball as the ball diameter is smaller than the opening provided when the clamp has been engaged by the lever or other mechanism. If a trailer becomes disengaged from the hitch ball, serious property damage and personal injury is probable and even deaths have occurred as a result.

Thus, there is a need in the art for a trailer hitch coupler that senses the size of the hitch ball and prevents the lever from latching or the clamp from being fully engaged when the hitch ball is of a smaller size than the coupler is configured to receive to prevent a user from coupling a trailer to a hitch ball that is too small. There is a further need in the art for a trailer hitch coupler to provide the operator a visual signal of whether the coupler is receiving a hitch ball of the correct diameter.

SUMMARY OF THE INVENTION

One aspect of the invention generally pertains to a trailer hitch coupler that senses the size of a hitch ball positioned within a hitch coupler socket and prevents a clamp or lever of the coupler from being fully engaged when the hitch ball is of a smaller size than the coupler is configured to receive.

Another aspect of the invention pertains to a trailer hitch coupler that provides the operator with a visual signal of whether the coupler is receiving a hitch ball of the correct diameter.

In accordance with one or more of the above aspects, there is provided a trailer hitch coupler to couple a trailer to a trailer hitch that includes a socket adapted for receiving a trailer hitch ball; a clamp associated with the socket and operable for engaging the trailer hitch ball; a sensor operatively connected with the socket and operable for determining a distance between an inner surface of the socket and an outer face of the trailer hitch ball when the trailer hitch ball is positioned within the socket; a clamp prevention device operatively connected with the socket and with the clamp and operable to prevent engagement of the clamp with the trailer hitch ball; and a release mechanism operatively connected with the sensor and the clamp prevention device and operable to release the clamp prevention device to allow the clamp to engage the trailer hitch ball when the sensor communicates a desired hitch condition.

In accordance with one or more of the above aspects, there is provided a trailer hitch coupler to couple a trailer to a trailer hitch that includes a socket adapted for receiving a trailer hitch ball; a clamp associated with the socket and operable for engaging the trailer hitch ball; a sensor operatively connected with the socket and operable for determining a distance between an inner surface of the socket and an outer face of the trailer hitch ball when the trailer hitch ball is positioned within the socket; a clamp prevention device operatively connected with the socket and with the clamp and operable to prevent engagement of the clamp with the trailer hitch ball; a release mechanism operatively connected with the sensor and the clamp prevention device and operable to release the clamp prevention device to allow the clamp to engage the trailer hitch ball when the sensor communicates a desired hitch condition; and a status display associated with said clamp prevention device that is operable to indicate whether the clamp prevention device is engaged or released.

These aspects are merely illustrative of the innumerable aspects associated with the present invention and should not be deemed as limiting in any manner These and other aspects, features and advantages of the present invention will become apparent from the following detailed description when taken in conjunction with the referenced drawings.

BRIEF DESCRIPTION OF THE SEVERAL VIEWS OF THE DRAWING

The accompanying drawing forms a part of the specification and is to be read in conjunction therewith, in which like reference numerals are employed to indicate like or similar parts in the various views, and wherein:

FIG. 3A is a perspective view of a clamp prevention device for a safety trailer hitch coupler in accordance with one embodiment of the present invention, wherein the clamp prevention device is engaged;

FIG. 3B is a perspective view of a clamp prevention device for a safety trailer hitch coupler, wherein the clamp prevention device is released;

FIG. 3C is a top view of a clamp prevention device for a safety trailer hitch coupler, wherein the clamp prevention device is engaged;

FIG. 3D is a top view of a clamp prevention device for a safety trailer hitch coupler, wherein the clamp prevention device is released;

FIG. 3E is a side view of a clamp prevention device for a safety trailer hitch coupler, wherein the clamp prevention device is engaged; and FIG. 3F is a top view of a clamp prevention device for a safety trailer hitch coupler, wherein the clamp prevention device is released.

DESCRIPTION OF THE INVENTION

Figure 1:
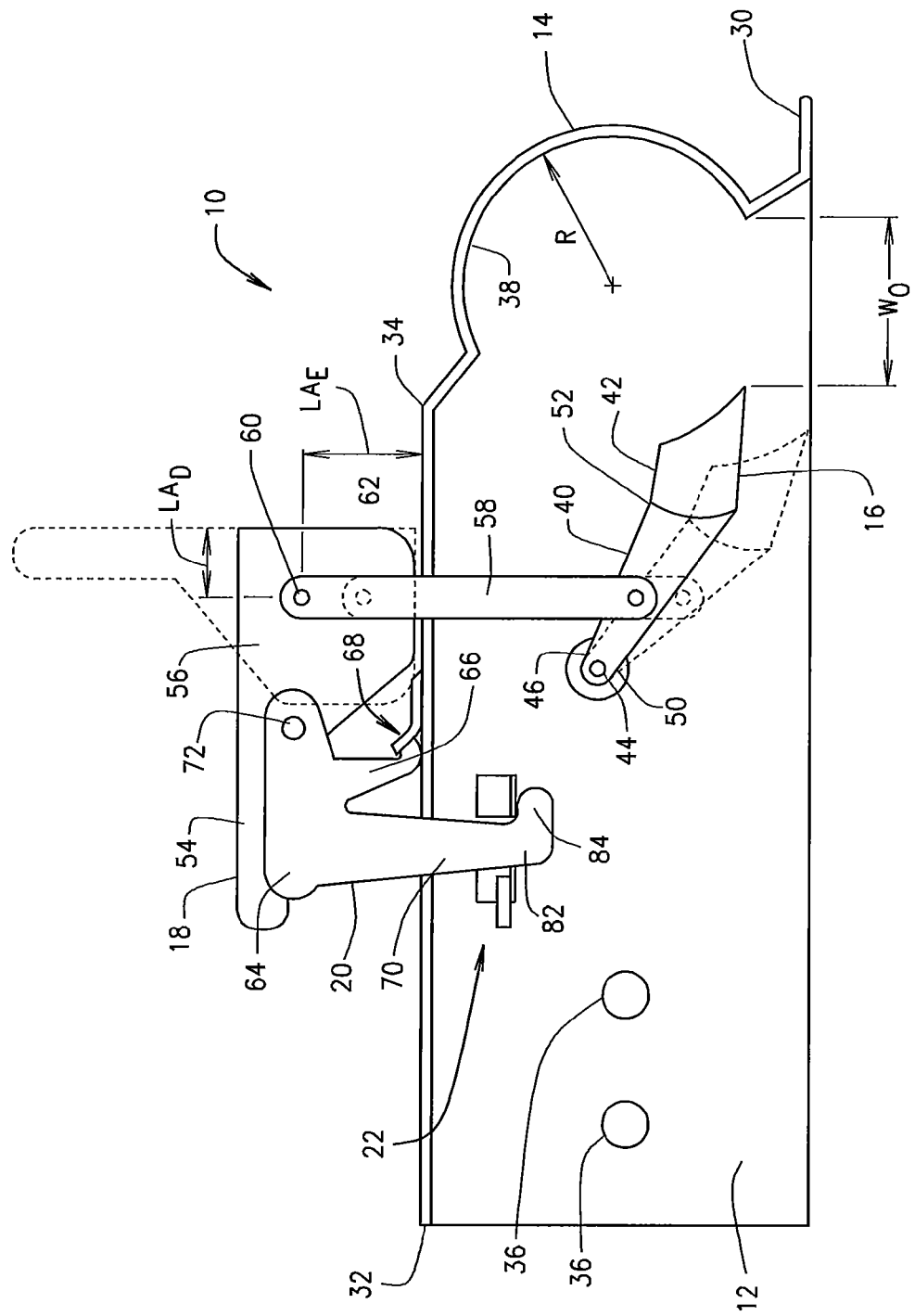
FIG. 1 is a cross-sectional view of a trailer hitch coupler in accordance with one embodiment of the present invention.
Figure 2A:
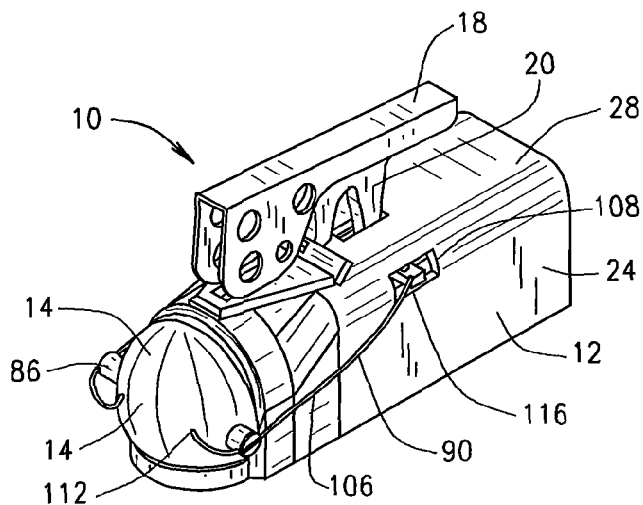
FIG. 2A is perspective view of a trailer hitch coupler in accordance with one embodiment of the present invention.
Figure 2C:
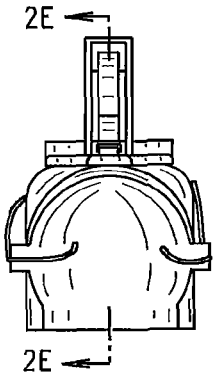
FIG. 2C is a front view of a trailer hitch coupler in accordance with one embodiment of the present invention.
Figure 2B:
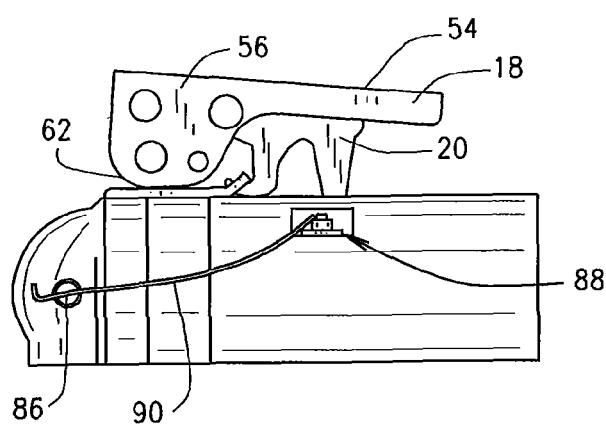
FIG. 2B is a side view of a trailer hitch coupler in accordance with one embodiment of the present invention.
Figure 2D:
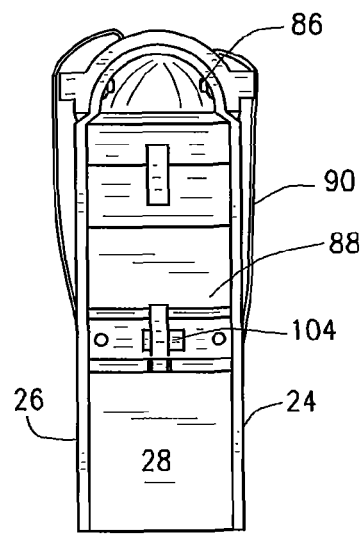
FIG. 2D is a bottom view of a trailer hitch coupler in accordance with one embodiment of the present invention.
Figure 2E:
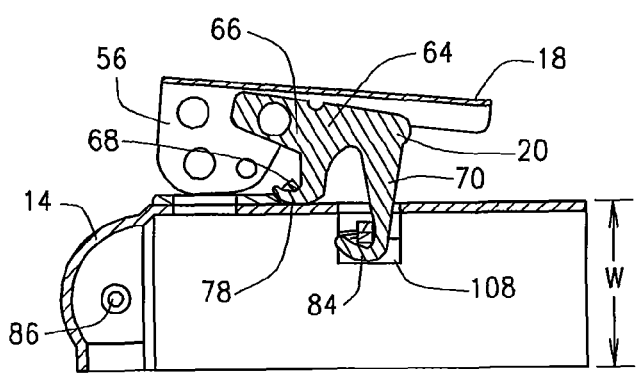
FIG. 2E is a cross-sectional view of the trailer hitch coupler of FIG. 2C taken along the line 2E-2E.

The following description of the invention illustrates specific embodiments in which the invention can be practiced. The embodiments are intended to describe aspects of the invention in sufficient detail to enable those skilled in the art to practice the invention. Other embodiments can be utilized and changes can be made without departing from the scope of the present invention.

The present invention is directed toward a safety trailer hitch coupler that prevents a trailer hitch coupler from being coupled to a smaller diameter hitch ball. Now turning to FIGS. 1-3, the safety trailer hitch coupler 10 of the present invention includes a neck 12, socket 14, clamp 16, a securing lever 18, a latch 20, and a lock-out assembly 22.

Neck 12 includes a first side wall 24, a second side wall 26, a top wall 28, flange 30, a first end 32 and a second end 34. Neck 12 is generally sheet steel that is pressed or machined into its final shape. Neck 12 may be sheet steel of gauge thickness ranging from 16 gauge to 6 gauge. Neck 12 may also be fabricated from plate steel ½" thick or greater depending upon the class of hitch and the desired load capacity. Neck 12 is generally a "U" shape defined by first side wall 24, second side wall 26, and top wall 28 wherein flange 30 is substantially perpendicular to side walls 24 and 26 to reinforce neck 12. The width W of side walls 24 and 26 and top wall 28 will be selected to match the dimensions of a tongue (not shown) of the trailer. Stock tube or pipe members are commonly used for trailer tongues. Rectangular or square tube members having outer dimensions of 2", 2½", 3", 3½", and 4" are commonly used. Neck 12 may also be sections of tube or pipe members having an inner dimension slightly greater than the outer dimension of the tongue section. Neck 12 is configured to fit snugly over the trailer tongue and bolted or welded to the trailer tongue. Neck 12 may include apertures 36 to facilitate neck 12 being bolted or welded to tongue (not shown). Neck 12 may be zinc plated, galvanized or painted to provide resistance to corrosion.

Socket 14 has a substantially spherical shape to receive a hitch ball and is integral or coupled to second end 34 of neck 12. Socket 14 has an inner surface 38 configured to a radius R. Socket 14 is generally configured to receive a hitch ball of a given diameter and radius R generally is equal to or slightly greater than the radius of the hitch ball. Socket 14 may be welded or bolted to neck 12; however, it is common for socket 14 and neck 12 to be included in a single press form during fabrication of safety trailer hitch coupler 10 from sheet steel as described above or welded to neck 12 if safety trailer hitch coupler 10 is fabricated from plate steel. Many configurations of neck 12 and socket 14 are known in the art, all of which are included in the scope of the present invention.

Clamp 16 generally comprises a lever arm 40, a body 42, a pivot point 44, and a rod 46. Clamp 16 is configured to removably engage the bottom and/or side of the hitch ball as shown in FIG. 1. Lever arm 40 has a first end 50 and a second end 52. Generally pivot point 44 is proximate first end 50 of lever arm 40. Body 42 of clamp 16 is operably coupled to second end 52 of lever arm 40 as shown. Body 42 may be rotated about pivot point 44 to bear against or be in close proximity to the hitch ball. When body 42 is engaged and proximate hitch ball, an opening width $W_o$ is present. When the correct size hitch ball is received by socket 14 and clamp 16 is engaged, opening width $W_o$ is appreciably less than the diameter of the hitch ball. Thereby, the trailer is prevented from lateral or vertical displacement such that the coupler disengages from the hitch ball. Clamp 16 and related mechanisms are well known in the art and all known configurations of clamp 16 for trailer hitch couplers are within the scope of the present invention.

Securing lever 18 includes handle 54 and leg 56. Generally, lever 18 is operably coupled to lever arm 40 of clamp 16 by link arm 58. Link arm 58 is pivotally coupled to leg 56 at pivot point 60. Handle 54 and leg 56 are levered about fulcrum 62. When handle 54 is in a generally horizontal position, lever 18 is considered to be engaged. When lever 18 is engaged, leg 56 is configured to provide engaged lever arm $LA_E$. When handle 54 is in a substantially vertical position, lever 18 is considered to be disengaged. When lever 18 is disengaged, leg 56 is configured to provide disengaged lever arm $LA_D$. Generally, engaged lever arm $LA_E$ is greater than $LA_D$ and when lever 18 is engaged, link arm 58 causes clamp 16 to engage the hitch ball.

Other embodiments of securing lever 18 are known in the art and all such known embodiments are within the scope of the present invention. In addition, other known mechanisms used to cause clamp 16 to engage the hitch ball are also within the scope of the present invention. For example, one embodiment of the present invention may include a threaded securing mechanism that includes a handle above top wall 28 of neck 12. The handle can be rotated thereby causing clamp 16 to engage the hitch ball by changing the relative position of clamp 16 using a screw mechanism.

Latching mechanism 20 is generally configured to prevent securing lever 18 or other securing mechanism from disengaging while towing the trailer. Latching mechanism 20 can also be used as a theft prevention device to store a trailer with the clamp engaged to prevent the coupler from being able to receive the hitch ball. Latching mechanism includes a latch body 64, a latch hook arm 66, a hook receiving member 68, and a lock-out arm 70. A portion of body 64 of latching mechanism 20 is pivotally coupled to securing lever 18 at pivot point 72. Latch hook arm 66 has a first end 74 and a second end 76 wherein the first end is integral with or coupled to body 64 and second end 76 may be configured with latch hook 78. Latch hook 78 is configured to be received by hook receiving member 68. In addition, lock-out arm 70 of latching mechanism 20 has a first end 80 and a second end 82. First end 80 of lock-out arm 70 is integral with or coupled to body 64 and second end 82 may include a hook 84. There are many known latching mechanisms in the art and all such latching mechanisms lend themselves for use in the safety trailer hitch coupler of the present invention and shall be within the scope of the present invention.

Lock-out system 22 is generally configured to prevent one or more of clamp 16, lever 18, or latching mechanism 20 from engaging when safety trailer hitch coupler 10 of the present invention receives a hitch ball that is smaller than what socket 14 is configured to receive. Lock-out system 22 generally includes a sensor 86, a clamp prevention device 88, and a release mechanism 90. Lock-out system 22 may also include a status display 92 that provides a user a visual indication of whether safety trailer hitch coupler 10 of the present invention is receiving the proper sized hitch ball.

Sensor 86 generally determines the distance between inner surface 38 of socket 14 and an outer face of a hitch ball. Any mechanism that is known in the art to measure this distance is within the scope of the present invention. An embodiment of sensor 86 includes a spring activated plunger that extends into socket 14 and is caused to be translated outwardly from inside surface 38 of socket 14 when the hitch ball is received by socket 14. An alternative embodiment of sensor 86 may include another known mechanical tab or member that is caused to translate due to displacement when socket 14 receives the hitch ball and returns to its original position when the hitch ball is removed. In an alternate embodiment, sensor 86 may comprise a ball plunger electromechanical switch or similar device, such as a roller plunger, chisel plunger, or push button. In this embodiment, the ball plunger is forced outwardly from the inside surface 38 of the socket 14 when the proper size hitch ball is received in the socket 14. This translation of the ball plunger activates the associated electrical switch in the device to trigger a signal to the release mechanism 90 as discussed below. In another embodiment, sensor 86 includes measuring a distance between the received hitch ball and the inner surface 38 of socket 14 using electronic, electro-magnetic, transducer, ultrasonic, laser, or other known non-contact distance measuring method known in the art.

Clamp prevention device 88 generally prevents one or more of clamp 16, securing lever 18, or latching mechanism 20 from functioning when safety trailer hitch coupler 10 of the present invention receives a hitch ball that is smaller than socket 14 is configured to receive. Any device that is known in the art to prevent one or more of clamp 16, securing lever 18 and clamping mechanism from functioning to close around a hitch ball that is too small is within the scope of the present invention. An embodiment of clamp prevention device 88 includes a latch arm receiving plate 94, at least one flag 96 pivotally coupled to latch arm receiving plate 94 with pin 98. An embodiment may include flag 96 being spring loaded so that it will return to a default position when not released. This embodiment may further include spacer 100 to position flag 96 above latch arm receiving plate 94. Further, an embodiment may include at least one stop 102 that prevents flag 96 from being displaced too far in a certain direction. Latch arm receiving plate 94 generally includes at least one aperture 104 configured to allow lock-out arm 70 to pass through.

Release mechanism 90 is generally in mechanical or electronic communication with sensor 86. If sensor 86 determines the correct hitch ball size is being received by socket 14, it communicates to release mechanism to cause the release of clamp prevention device 88. Release mechanism 90 generally releases the clamp prevention device 88 to allow clamp 16, securing lever 18, and latching mechanism 20 to be fully engaged to secure clamp 16 in position to secure safety trailer hitch coupler with respect to the hitch ball.

One embodiment of release mechanism 90 includes a high strength cable 106 with a first end 112 coupled to socket 14, and a second end 116 coupled to flag 96. Cable 106 is coupled to sensor 86 being a spring loaded plunger 86 along its length. When the proper size hitch ball is received into socket 14, the plunger 86 is displaced outwardly causing cable 106 to be displaced outwardly and to apply a force to flag 96 pivotally coupled to said latch receiving plate 94. The displacement of cable 106 pulls on and causes rotation of flag 96 about pin 98 thereby displacing flag 96 from its default position covering aperture 104 of latch arm receiving plate 94. If the hitch ball is the correct size, sensor 86, clamp prevention device 88 and release mechanism 90 are configured to displace flag 96 such that lock-out arm 70 may pass through aperture 104 of latch arm receiving plate 94 allowing hook 78 to engage hook receiving member 68. If the hitch ball does not cause the full displacement of sensor 86, flag 96 will not be sufficiently displaced thereby preventing lock-out arm 70 from passing through aperture 104 of latch arm receiving plate 94 and preventing the latching mechanism 20 from being fully engaged. The inability of a user to fully engage latching mechanism 20 will indicate to user that the wrong size of hitch ball is being received into socket 14 of safety trailer hitch coupler 10.

Other mechanical methods of preventing clamp 16, securing lever 18, and/or latching mechanism 20 to only be fully engaged when the correct size of hitch ball is received into socket 14. Spring loaded plunger 86 may be journaled for spiral rotation when spring loaded plunger 86 is displaced outwardly causing plunger to rotate away from flag 96 whereby cable 106 applies a pulling force upon flag 96. If spring loaded plunger 86 is sufficiently displaced, flag 96 will be rotated to uncover aperture 104.

Another embodiment includes sensor 86 tripping an electronic switch that causes an electronic or magnetic release of clamp prevention device 88. The clamp preventing device 88 may be motorized and release mechanism 90 may send an electronic signal to the motor of clamp preventing device 88 wherein motor of claim preventing device 88 acts to allow clamp 16, securing lever 18, and/or latching mechanism 20 to be fully engaged. The trailer may have its own battery system to power an electronic sensor 86, clamp preventing device 88, and release mechanism 90, or an electronic sensor 86, clamp preventing device 88, and release mechanism 90 may be powered through the electrical connection with a towing vehicle. This configuration may also provide an additional safeguard to ensure that the trailer is electronically connected to the tow vehicle prior to the trailer being securely coupled to the towing vehicle.

An embodiment of the present invention may also include a status display 92 that provides a visual indicator to the operator that the clamp prevention device 88 is activated and the hitch ball is the wrong size. One embodiment of status display 92 may provide a window 108 that a user can view a portion of flag 96 that is painted red. When the red portion is visible, the clamp prevention device 88 is activated and when no red portion is visible, the clamp prevention device 88 has been released to allow clamp 16, securing lever 18, and latching mechanism 20 to be fully engaged.

From the foregoing, it may be seen that the continuous passive motion device of the present invention is particularly well suited for the proposed usages thereof. Furthermore, since certain changes may be made in the above invention without departing from the scope hereof, it is intended that all matter contained in the above description or shown in the accompanying drawing be interpreted as illustrative and not in a limiting sense.

I claim:

1. A trailer hitch coupler to couple a trailer to a trailer hitch, said trailer hitch coupler comprising:
   a neck;
   a socket connected with said neck and adapted for receiving a trailer hitch ball;
   a clamp associated with said socket and operable for engaging said trailer hitch ball when said trailer hitch ball is positioned within said socket;
   a sensor operatively connected with said socket, said sensor being operable for determining a distance between an inner surface of said socket and an outer face of said trailer hitch ball when said trailer hitch ball is positioned within said socket;
   a clamp prevention device operatively connected with said socket and with said clamp, said clamp prevention device being operable to prevent engagement of said clamp with said trailer hitch ball; and
   a release mechanism operatively connected with said sensor and said clamp prevention device and operatively connecting said sensor with said clamp prevention device, said release mechanism operable to release said clamp prevention device, thereby allowing said clamp to engage said trailer hitch ball, when said sensor communicates a desired hitch condition.

2. The trailer hitch coupler according to claim, 1 wherein said sensor includes a spring loaded plunger;
   wherein said claim prevention device further comprises a latch arm receiving plate having an aperture, a flag pivotally coupled to said latch arm receiving plate wherein said flag substantially covers said aperture;
   wherein said release mechanism includes a cable coupled to said spring loaded plunger; and
   wherein said release mechanism will release said clamp prevention device when a hitch ball is the size for which a socket of the trailer hitch coupler is configured to receive.

3. The trailer hitch coupler according to claim 1 wherein said sensor is a non-contact sensor and said release mechanism is in electronic communication with said sensor and said clamp prevention device.

4. The trailer hitch coupler according to claim 1, wherein said desired hitch condition comprises a hitch ball of the size for which said socket is configured to receive being positioned within said socket.

5. The trailer hitch coupler according to claim 1, wherein said sensor is selected from the group consisting of a mechanical tab, ball plunger, roll plunger, chisel plunger, and push button.

6. The trailer hitch coupler according to claim 3, wherein said non-contact sensor is selected from the group consisting of electronic, electro-magnetic, transducer, ultrasonic, and laser distance measuring devices.

7. The trailer hitch coupler according to claim 1, further comprising a securing lever operatively connected with said clamp and with said clamp prevention device, wherein said clamp is selectively placed in engagement and disengagement positions by lowering and raising said securing lever, and wherein said clamp prevention device prevents said clamp from engaging said trailer hitch ball be preventing said securing lever from being lowered.

8. The trailer hitch coupler according to claim 7, further comprising a link arm pivotally connecting said clamp and said securing lever.

9. The trailer hitch coupler according to claim 7, further comprising:
   a latching mechanism connecting with said securing lever, said latching mechanism comprising a latch hook;
   a hook receiving member connected to said neck at a portion of said neck adjacent said securing lever and operable for engaging said latch hook when said securing lever is in a lowered position.

10. The trailer hitch coupler according to claim 1, wherein said sensor comprises an electrical switch, wherein said release mechanism comprises an electrical signal transmission conduit and an electro-magnetic device operable to release said clamp prevention device to allow said clamp to engage said trailer hitch ball.

11. The trailer hitch coupler according to claim 1, wherein said clamp prevention device comprises a motor operable for releasing said clamp prevention device to allow said clamp to engage said trailer hitch ball, wherein said sensor comprises an electrical switch, and wherein said release mechanism comprises an electrical signal transmission conduit between said electrical switch and said motor.

12. The trailer hitch coupler according to claim 1, further comprising a status display associated with said clamp prevention device that is operable to indicate whether the clamp prevention device is engaged or released.

* * * * *